(12) United States Patent
Jeon et al.

(10) Patent No.: US 11,296,323 B2
(45) Date of Patent: Apr. 5, 2022

(54) POSITIVE ELECTRODE FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Bokkyu Jeon, Yongin-si (KR); Junghyun Nam, Yongin-si (KR); Hoon Seok, Yongin-si (KR); Heeeun Yoo, Yongin-si (KR); Yeonhee Yoon, Yongin-si (KR); Mokyun Jin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/344,339

(22) PCT Filed: Oct. 31, 2017

(86) PCT No.: PCT/KR2017/012144
§ 371 (c)(1),
(2) Date: Apr. 23, 2019

(87) PCT Pub. No.: WO2018/084526
PCT Pub. Date: May 11, 2018

(65) Prior Publication Data
US 2020/0075955 A1    Mar. 5, 2020

(30) Foreign Application Priority Data
Nov. 4, 2016 (KR) .................. 10-2016-0146574

(51) Int. Cl.
*H01M 4/62* (2006.01)
*H01M 4/36* (2006.01)
(Continued)

(52) U.S. Cl.
CPC ............. *H01M 4/62* (2013.01); *H01M 4/366* (2013.01); *H01M 10/0525* (2013.01); *H01M 2004/021* (2013.01); *H01M 2004/028* (2013.01)

(58) Field of Classification Search
CPC .... H01M 4/62; H01M 4/366; H01M 10/0525; H01M 2004/021; H01M 2004/028
See application file for complete search history.

(56) References Cited

U.S. PATENT DOCUMENTS

2006/0099495 A1    5/2006 Suzuki et al.
2007/0015058 A1    1/2007 Takezawa et al.
(Continued)

FOREIGN PATENT DOCUMENTS

CN    1897331 A    1/2007
CN    101207197 A    6/2008
(Continued)

OTHER PUBLICATIONS

EPO Extended Search Report dated Mar. 23, 2020, for corresponding European Patent Application No. 17868245.6 (9 pages).
(Continued)

*Primary Examiner* — Stewart A Fraser
(74) *Attorney, Agent, or Firm* — Lewis Roca Rothgerber Christie LLP

(57) ABSTRACT

The present invention relates to a positive electrode for a lithium secondary battery and a lithium secondary battery comprising the same, wherein the positive electrode comprises: a current collector; an active material layer formed on the current collector and comprising a compound capable of intercalating and deintercalating lithium; and a coating layer formed on the active material layer and comprising an aqueous binder and a compound of Chemical Formula 1 having an average particle diameter (D50) of 2 μm or less.

$$Li_aFe_{1-x}M_xPO_4 \quad \text{[Chemical Formula 1]}$$

(In Chemical Formula 1, 0.90≤a≤1.8, 0≤x≤0.7, and M is Mg, Co, Ni, or a combination thereof)

7 Claims, 13 Drawing Sheets

(51) Int. Cl.
   *H01M 10/0525* (2010.01)
   *H01M 4/02* (2006.01)

(56) References Cited

U.S. PATENT DOCUMENTS

| | | |
|---|---|---|
| 2009/0239148 A1 | 9/2009 | Jiang |
| 2011/0020703 A1 | 1/2011 | Suzuki et al. |
| 2015/0228973 A1 | 8/2015 | Won et al. |
| 2016/0013480 A1 | 1/2016 | Sikha et al. |

FOREIGN PATENT DOCUMENTS

| | | | |
|---|---|---|---|
| CN | 101978534 A | | 2/2011 |
| CN | 101981728 A | | 2/2011 |
| CN | 202189864 U | | 4/2012 |
| CN | 105074967 A | | 11/2015 |
| EP | 2 500 965 A2 | | 9/2012 |
| JP | 2002-15735 A | | 1/2002 |
| JP | 2002015735 A | * | 1/2002 |
| JP | 2006-134770 A | | 5/2006 |
| KR | 10-2007-0009447 A | | 1/2007 |
| KR | 10-2009-0008870 A | | 1/2009 |
| KR | 20090008870 A | * | 1/2009 |
| KR | 10-2014-0070259 A | | 6/2014 |
| KR | 10-2014-0140976 A | | 12/2014 |
| KR | 10-2014-0146946 A | | 12/2014 |
| KR | 10-2015-0024704 A | | 3/2015 |
| KR | 10-2015-0093539 A | | 8/2015 |

OTHER PUBLICATIONS

Office Action with English translation dated Jul. 2, 2021, including Jun. 28, 2021 Search Report, for corresponding Chinese Patent Application No. 201780067712.7 (23 pages).
Office action issued in corresponding Chinese Patent Application No. 201780067712.7, dated Dec. 24, 2021, 15 pp. including translation.
Office action issued in corresponding Korean Patent Application No. 10-2016-0146574, dated Nov. 30, 2021, 19pp. including translation.
Office Action dated Jan. 27, 2022 of related Korean Patent Application No. 10-2021-0189994, 6pp.

* cited by examiner

POSITIVE ELECTRODE FOR LITHIUM SECONDARY BATTERY AND LITHIUM SECONDARY BATTERY COMPRISING SAME

CROSS-REFERENCE TO RELATED APPLICATION(S)

This application is a National Phase Patent Application of International Patent Application Number PCT/KR2017/012144, filed on Oct. 31, 2017, which claims priority of Korean Patent Application No. 10-2016-0146574, filed Nov. 4, 2016. The entire contents of both of which are incorporated herein by reference.

TECHNICAL FIELD

A positive electrode for a lithium secondary battery and a lithium secondary battery including the same are disclosed.

BACKGROUND ART

A lithium secondary battery has recently drawn attention as a power source for small portable electronic devices.

Such a lithium secondary battery includes a positive electrode including a positive active material, a negative electrode including a negative active material, a separator disposed between the positive electrode and the negative electrode, and an electrolyte.

The positive active material may include an oxide including lithium and a transition metal and having a structure capable of intercalating lithium ions such as $LiCoO_2$, $LiMn_2O_4$, $LiNi_{1-x}Co_xO_2(0<x<1)$, and the like.

The negative active material may include various carbon-based materials capable of intercalating/deintercalating lithium such as artificial graphite, natural graphite, hard carbon, and the like, or a Si-based active material.

DETAILED DESCRIPTION OF THE INVENTION

Technical Problem

An embodiment provides a positive electrode for a lithium secondary battery having improved thermal safety and cycle-life characteristics that provides an excellent.

Another embodiment provides a lithium secondary battery including the positive electrode.

Technical Solution

An embodiment provides a positive electrode for a lithium secondary battery including a current collector; an active material layer formed on the current collector and comprising a compound capable of intercalating and deintercalating lithium; and a coating layer formed on the active material layer and including an aqueous binder and a compound of Chemical Formula 1 having an average particle diameter (D50) of 2 μm or less.

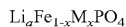

[Chemical Formula 1]

In Chemical Formula 1, 0.90≤a≤1.8, 0≤x≤0.7, and M is Co, Ni, Mn, or a combination thereof.

An average particle diameter (D50) of the compound of Chemical Formula 1 may be 0.2 μm to 1 μm.

A thickness of the coating layer may be 1 μm to 13 μm.

The aqueous binder may be an aqueous binder having oxidation resistance.

The coating layer may further include a thickener.

A ratio of the thickness of the thickness of the active material layer to the coating layer may be 30:1 to 10:1.

A mixing ratio of the compound of Chemical Formula 1 and the aqueous binder may be a weight ratio of 24:1 to 50:1.

Another embodiment provides a lithium secondary battery including the positive electrode; a negative electrode including a negative active material; and an electrolyte.

Other embodiments of the present invention are included in the following detailed description.

Advantageous Effects

The positive electrode for a lithium secondary battery according to an embodiment may exhibit excellent thermal safety and cycle-life characteristics.

MODE FOR INVENTION

Figure 1:
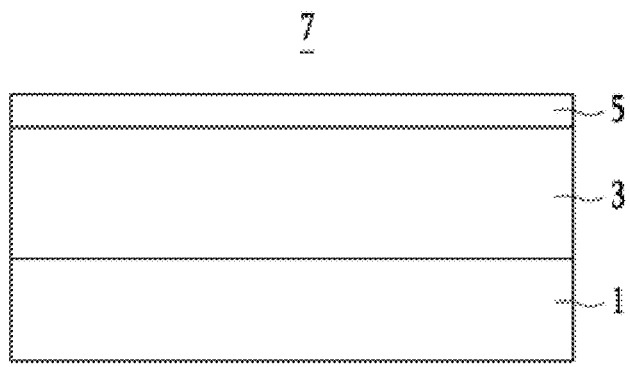
FIG. 1 schematically illustrates a structure of a positive electrode according to an embodiment of the present invention.

Hereinafter, embodiments of the present invention are described in detail. However, these embodiments are exemplary, the present invention is not limited thereto and the present invention is defined by the scope of claims.

A positive electrode for a lithium secondary battery according to an embodiment of the present invention includes a current collector; an active material layer formed on the current collector and comprising a compound capable of intercalating and deintercalating lithium; and a coating layer formed on the active material layer and comprising an aqueous binder and a compound of Chemical Formula 1 having an average particle diameter (D50) of 2 μm or less.

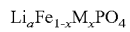

[Chemical Formula 1]

$Li_aFe_{1-x}M_xPO_4$

In Chemical Formula 1, 0.90≤a≤1.8, 0≤x≤0.7, and

M is Co, Ni, Mn or a combination thereof.

In this way, in the positive electrode according to an embodiment, the active material layer is disposed between the current collector and the coating layer, but when the coating layer is formed on the current collector, and the active material layer is formed on the coating layer, that is, the coating layer is formed between the current collector and the active material layer, the compound of Chemical Formula 1 has low electron conductivity, and accordingly resistance and output characteristics are deteriorated.

An average particle diameter (D50) of the compound of Chemical Formula 1 may be 2 μm or less, or 0.2 μm to 1 μm. When the average particle diameter (D50) of the compound of Chemical Formula 1 is larger than 1 μm, electron conductivity is deteriorated, thus a utilization rate of the compound represented by Chemical Formula 1 is decreased, battery resistance increases, and accordingly, cycle-life characteristics may be deteriorated. In the present specification, when a definition is not otherwise provided, an average diameter (D50) indicates a diameter of a particle where a cumulative volume is about 50 volume % in a particle distribution.

The aqueous binder may be an oxidation-resistant binder, and for example, any aqueous binder having oxidation resistance at a positive electrode potential of 4.45 V (vs. $Li^+$) or less may be used.

Examples of such an aqueous binder may be a styrene-butadiene rubber, an acrylate-based compound, an imide-based compound, a polyvinylidene fluoride-based compound, a polyvinylpyrrolidone-based compound, a nitrile-based compound, an acetate-based compound, a cellulose-based compound, a cyano-based compound.

Specific examples of the acrylate-based compound may be polyacrylic acid (PAA), polymethylmethacrylate, polyisobutylmethacrylate, polyethylacrylate, polybutyl acrylate, polyethylhexylacrylate (poly(2-ethylhexyl acrylate)), or a combination thereof.

Specific examples of the imide-based compound may be polyimide, polyamide imide, or a combination thereof. In addition, specific examples of the polyvinylidene fluoride-based compound may be polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene and polyvinylidene fluoride-co-ethylenefluoride-hexafluoropropylene (PVdF), polyvinylidene fluoride-trichloroethylene, or a combination thereof and specific examples of the polyvinylpyrrolidone-based compound may be polyvinylpyrrolidone, or a combination thereof.

In addition, specific examples of the nitrile-based compound may be polyacrylonitrile, an acrylonitrile-styrene-butadiene copolymer, or a combination thereof, specific examples of the acetate-based compound may be polyvinylacetate, polyethylene-co-vinyl acetate, cellulose acetate, cellulose acetate butyrate, cellulose acetate propionate, or a combination thereof, specific examples of the cellulose-based compound may be cyanoethyl cellulose, carboxyl methyl cellulose, or a combination thereof, and specific examples of the cyano-based compound may be cyanoethyl sucrose.

The binder having excellent antioxidation may be well combined with the compound of Chemical Formula 1 as well as a compound capable of reversibly intercalating and deintercalating lithium in the active material layer and thus firmly maintain bonds between the coating layer and the active material layer.

When the aqueous binder is used in the coating layer, water doing no damage on an electrode may be used as a solvent for forming the coating layer. When an organic binder rather than the aqueous binder is used for the coating layer, an organic solvent should be used as a solvent for forming the coating layer but does damage on an electrode, that is, causes a spring back problem and accordingly, may deteriorate electron conductivity, excessively increase a battery thickness, and structurally have a negative influence on the active material layer.

A thickness of the coating layer may be 1 μm to 13 μm, and in an embodiment, 2 μm to 4 μm. When the thickness of the coating layer is included within the range, safety may be fortified.

A thickness of the active material layer may be 60 μm to 70 μm, and in an embodiment, 30 μm to 70 μm. When the active material layer has a thickness within the ranges, energy density may be increased according to thickening.

In addition, a ratio of the thickness of the thickness of the active material layer to the coating layer may be 30:1 to 10:1. When the ratio of the thickness of the coating layer relative to the thickness of the active material layer is included within the range, a coating layer improving safety as well as minimizing energy density deterioration may be obtained. Particularly, when the thickness of the coating layer and the thickness of the active material layer are within the ranges, and thus the ratio of the thickness of the coating layer relative to the thickness of the active material layer is included within the range, safety may be fortified due to an appropriate thickness of the coating layer depending on a thickness of the active material layer.

The thickness of the active material layer may be a thickness after a compression process during a manufacture of a positive electrode.

A mixing ratio of the compound of Chemical Formula 1 and the aqueous binder may be a weight ratio of 24:1 to 50:1 or 43:1 to 50:1. When the mixing ratio of the compound of Chemical Formula 1 and the aqueous binder are included within the range, it may be advantageous as an appropriate ratio in terms of energy density, adherence, dispersibility, and the like.

The coating layer may further include a thickener. The thickener may include one or more of carboxylmethyl cellulose, hydroxypropylmethyl cellulose, methyl cellulose, or alkali metal salts thereof. The alkali metals may be Na, K, or Li. When the coating layer further includes the thickener, an amount of the thickener may be 0.6 parts by weight to 2 parts by weight based on 100 parts by weight of the compound of Chemical Formula 1. When the thickener is included within range, the resistance increase may be minimized, but thickening and dispersibility may be improved.

In this way, the coating layer includes the compound of Chemical Formula 1 and the aqueous binder and optionally, the thickener but not a conductive material. When the coating layer includes the conductive material, a short circuit occurs and the like, and accordingly, safety may be deteriorated.

In addition, in this way, the compound of Chemical Formula 1 and the compound capable of intercalating and deintercalating lithium are present as a separate layer, but when the compound of Chemical Formula 1 and the compound capable of intercalating and deintercalating lithium are mixed in one layer, the compound of Chemical Formula 1 is deteriorated at an operation voltage of the compound capable of intercalating and deintercalating lithium, and accordingly, and accordingly, an effect of improving thermal stability due to use of the compound of Chemical Formula 1 may not be obtained.

A compound (lithiated intercalation compound) capable of intercalating and deintercallating lithium included in the active material layer may be any generally-used compound as a positive active material of a lithium secondary battery. Specifically, one or more composite oxides of a metal selected from cobalt, manganese, nickel, and a combination thereof, and lithium may be used. For more specific examples, the compounds represented by one of chemical formulae may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a3 \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$($0.90 \le a \le 1.8$, $0.001 \le b \le 0.1$) $Li_aCoG_bO_2$($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$ $QS_2$ $LiQS_2$ $V_2O_5$ $LiV_2O_5$ $LiZO_2$ $LiNiVO_4$ $Li_{(3-f)}J_2$ $(PO_4)_3$($0 \le f \le 2$).

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound, (for example, the method may include any coating method (e.g., spray coating, dipping, etc.), but is not illustrated in more detail since it is well-known to those skilled in the related field.

The active material layer may further include a binder and a conductive material. the binder may be polyvinyl alcohol, carboxylmethyl cellulose, hydroxypropyl cellulose, diacetyl cellulose, polyvinylchloride, polyvinylfluoride, polyvinylpyrrolidone, polyurethane, polytetrafluoroethylene, polyvinylidene fluoride, polyethylene, polypropylene, styrene-butadiene rubber, acrylated styrene butadiene rubber, an epoxy resin, nylon, and the like. In addition, in an embodiment, the binder may be appropriately an organic binder that is polyvinylfluoride, polyvinylpyrrolidone, polyurethane, polytetrafluoroethylene, polyvinylidene fluoride, polyethylene, polypropylene, or a combination thereof.

The current collector may be an aluminum foil, a nickel foil, or a combination thereof, but is not limited thereto.

FIG. 1 schematically illustrates a positive electrode 7 according to an embodiment including a current collector 1, an active material layer 3 formed on the current collector 1, and a coating layer 5 formed on the active material layer 3.

The positive electrode may be manufactured by coating a positive active material composition in a form of a slurry on a current collector, drying and compressing to form a positive active material layer, and coating a coating layer composition including the compound of Chemical Formula 1 and an aqueous binder on the positive active material layer. The coating layer composition may be compressed after the drying process.

Accordingly, the positive active material layer may have a dense structure, and the coating layer may have a porous structure. The positive active material composition includes a compound intercalating and deintercalating lithium as a positive active material, a binder, a conductive material, and an organic solvent, and the coating layer composition includes the compound of Chemical Formula 1, an aqueous binder, and a water solvent. The organic solvent may be N-methyl pyrrolidone. In addition, in the positive active material composition, each amount of the positive active material, the binder, and the conductive material may be appropriately used to have the aforementioned positive active material layer composition, and in the coating layer composition, each amount of the compound of Chemical Formula 1 and the aqueous binder may be appropriately used to have the aforementioned coating layer composition.

Another embodiment of the present invention provides a lithium secondary battery including the positive electrode, a negative electrode including a negative active material, and an electrolyte.

The negative electrode includes a current collector and a negative active material layer formed on the current collector and including a negative active material.

The negative active material includes a material that reversibly intercalates/deintercalates lithium ions, a lithium metal, a lithium metal alloy, a material capable of doping and dedoping lithium, or a transition metal oxide.

The material that reversibly intercalates/deintercalates lithium ions is a carbon material, and may be any generally-used carbon-based negative active material in a lithium ion secondary battery, and examples thereof may be crystalline carbon, amorphous carbon, or a combination thereof. Examples of the crystalline carbon may be a graphite such as a unspecified shape, sheet-shaped, flake, spherical shaped or fiber-shaped natural graphite or artificial graphite, and examples of the amorphous carbon may be soft carbon or hard carbon, a mesophase pitch carbonized product, fired cokes, and the like.

The lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, $SiO_x$ (0<x<2), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and not Sn), and the like, and at least one thereof may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of 95 wt % to 99 wt % based on a total weight of the negative active material layer.

In an embodiment of the present invention, the negative active material layer includes a binder, and optionally a conductive material. In the negative active material layer, an amount of the binder may be 1 wt % to 5 wt % based on a total amount of the negative active material layer. When the conductive material is further included, 90 wt % to 98 wt % of negative active material, 1 wt % 20 to 5 wt % of the binder, and 1 wt % to 5 wt % of the conductive material may be used.

The binder serves to adhere the negative active material particles to each other and to adhere the negative active material to a current collector. The binder includes a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide polytetrafluoroethylene, or a combination thereof.

The water-soluble binder may be a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyethyleneoxide, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as the negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of 0.1 parts by weight to 3 parts by weight based on 100 parts by weight of the negative active material.

Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol based solvent may include ethanol, isopropyl alcohol, and the like, and the aprotic solvent may include nitriles such as R—CN (wherein R is a C2 to C20 linear, branched, or cyclic hydrocarbon group, or may include a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture and when the organic solvent is used in a mixture, a mixture ratio may be controlled in accordance with a desirable battery performance, which may be understood by a person having an ordinary skill in this art.

In addition, the carbonate-based solvent may include a mixture of a cyclic carbonate and a linear (chain) carbonate. In this case, when the cyclic carbonate and the linear carbonate may be mixed together in a volume ratio of 1:1 to 1:9, performance of an electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

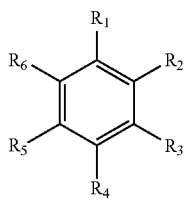

In Chemical Formula 1, $R_1$ to $R_6$ are the same or different and are selected from the group consisting of hydrogen, a halogen, a C1 to C10 alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive for improving the cycle-life of vinylene carbonate or an ethylene carbonate-based compound of Chemical Formula 2.

[Chemical Formula 2]

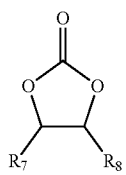

In Chemical Formula 2, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in an organic solvent supplies a battery with lithium ions, basically operates the lithium secondary battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)$ ($C_yF_{2y+1}SO_2$), wherein, x and y are natural numbers, for example an integer ranging from 1 to 20), LiCl, LiI, and $LiB(C_2O_4)_2$ (lithium bis(oxalato) borate: LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

A separator may be disposed between the positive electrode and the negative electrode. The separator may use polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and the like.

Figure 2:
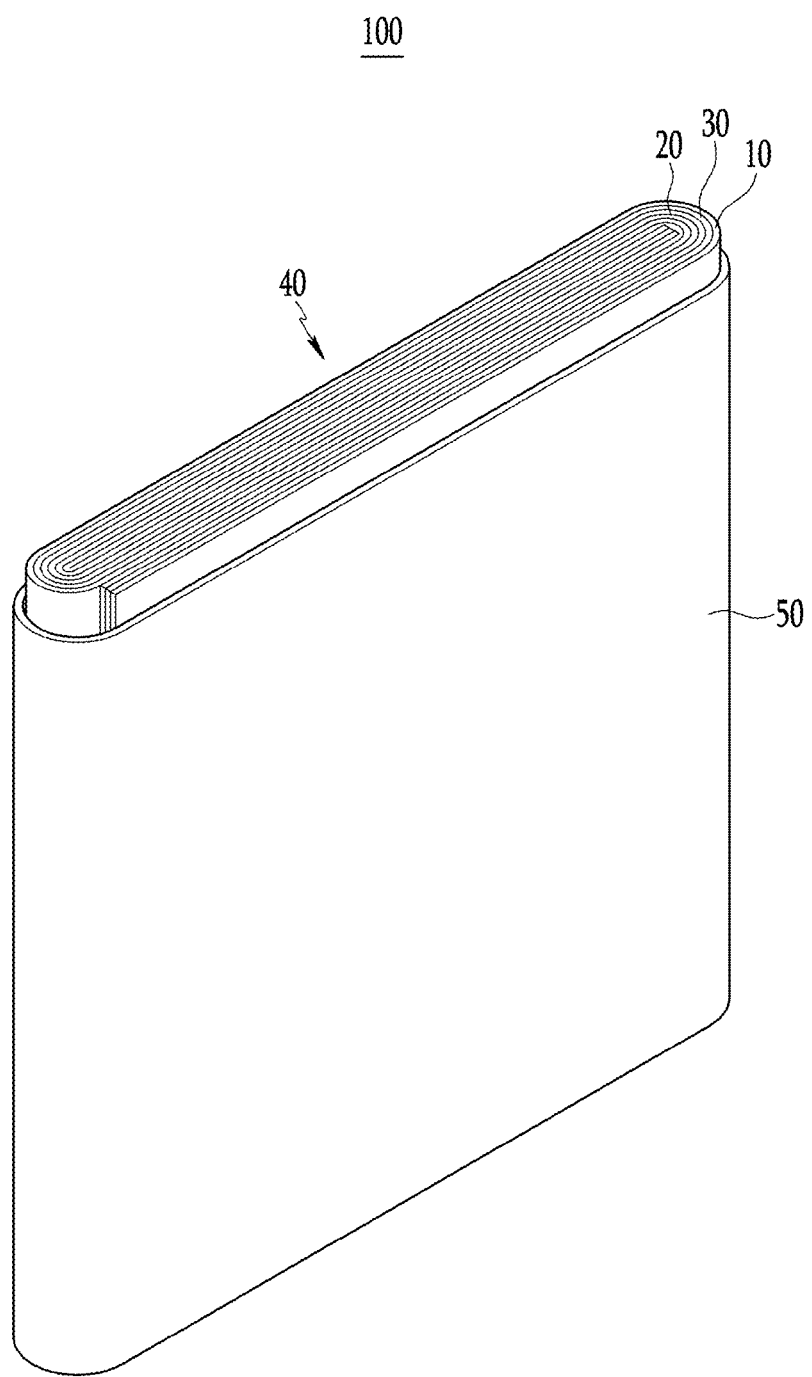
FIG. 2 schematically illustrates a structure of a lithium secondary battery an embodiment of the present invention.

FIG. 2 is an exploded perspective view showing a lithium secondary battery according to one embodiment. The lithium secondary battery according to an embodiment is illustrated as a prismatic battery but is not limited thereto and may include variously-shaped batteries such as a cylindrical battery, a pouch battery, and the like.

Referring to FIG. 2, a lithium secondary battery 100 according to an embodiment may include an electrode assembly 40 manufactured by winding a separator 30 disposed between a positive electrode 10 and an negative electrode 20 and a case 50 housing the electrode assembly 40. An electrolyte (not shown) may be impregnated in the positive electrode 10, the negative electrode 20, and the separator 30.

Mode for Performing Invention

Hereinafter, examples of the present invention and comparative examples are described. These examples, however, are not in any sense to be interpreted as limiting the scope of the invention.

Example 1

96 wt % of a positive active material of $LiNi_{0.6}Co_{0.2}Mn_{0.2}O_2$ and $LiNi_{0.6}Co_{0.2}Al_{0.2}O_2$ (a weight ratio of 80:20), 2 wt % of denka black, and 2 wt % of polyvinylidene fluoride were mixed in an N-methyl pyrrolidone solvent to prepare positive active material slurry.

96 wt % of $LiFePO_4$ having an average particle diameter (D50) of 0.42 μm, 2 wt % of a carboxylmethyl cellulose thickener, and 2 wt % of an acrylate-based compound binder were mixed in a water solvent to prepare coating layer slurry.

The positive active material slurry was coated on an Al foil current collector and dried. Subsequently, the dried product was compressed to form a 60 μm-thick positive active material layer.

Figure 3:
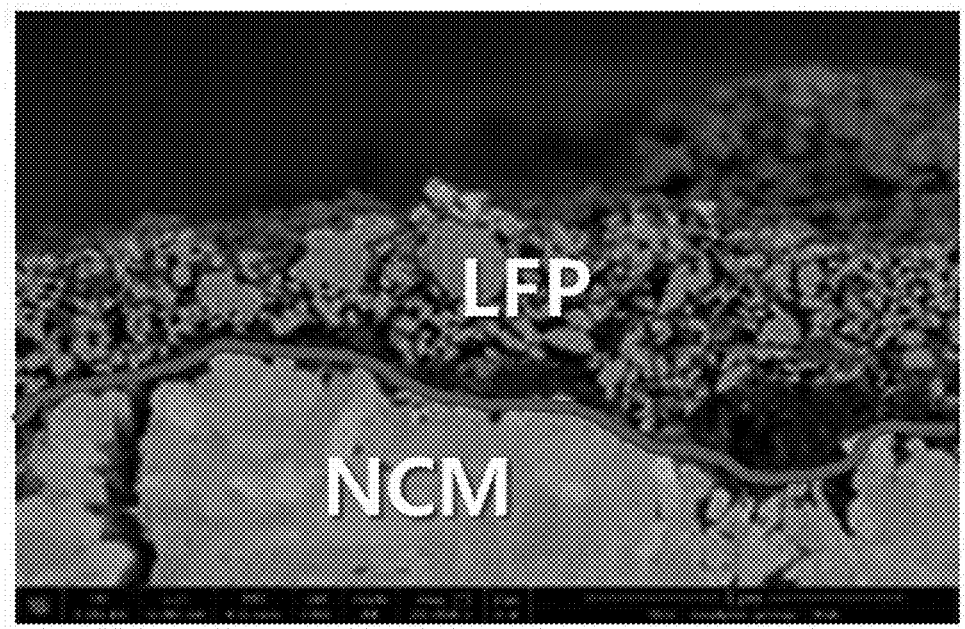
FIG. 3 is a SEM cross-sectional photograph of the positive electrode produced according to Example 1.

On the positive active material layer, the coating layer slurry was coated and dried to form a 3.5 μm-thick coating layer to manufacture a positive electrode. A photograph of a cross section of the manufactured positive electrode was taken, and a part thereof showing the active material layer and the coating layer was shown in FIG. 3. As shown in FIG. 3, the active material layer (NCM) and the coating layer (LFP) were formed as two separate layers.

98 wt % of graphite, 0.8 wt % of carboxylmethyl cellulose, and 1.2 wt % of a styrene-butadiene rubber were mixed in pure water to prepare negative active material slurry. The negative active material slurry was coated on a Cu foil and then, dried and compressed to manufacture a negative electrode.

The positive and negative electrodes and an electrolyte were used to manufacture a lithium secondary battery cell in a common method. The electrolyte was prepared by dissolving 1.0 M LiPF$_6$ in a mixed solvent of ethylene carbonate and dimethyl carbonate (a volume ratio of 50:50).

Comparative Example 1

96 wt % of a positive active material of LiNi$_{0.6}$Co$_{0.2}$Mn$_{0.2}$O$_2$ and LiNi$_{0.6}$Co$_{0.2}$Al$_{0.2}$O$_2$ (a weight ratio of 80:20), 2 wt % of denka black, and 2 wt % of polyvinylidene fluoride were mixed in an N-methyl pyrrolidone solvent to prepare positive active material slurry.

The positive active material slurry was coated on an Al-foil current collector and dried. Subsequently, the dried product was compressed to form a 60 μm-thick positive active material layer to manufacture a positive electrode.

The positive electrode was used to manufacture a lithium secondary battery cell according to the same method as Example 1.

Comparative Example 2

A lithium secondary battery cell was manufactured according to the same method as Example 1 except that 96 wt % of LiFePO$_4$ having an average particle diameter (D50) of 3.2 μm, 2 wt % of a carboxylmethyl cellulose thickener, and 2 wt % of an acrylate-based aqueous binder were mixed in a water solvent to prepare coating layer slurry.

Comparative Example 3

The coating layer slurry prepared in Example 1 was coated on an Al foil current collector and dried to form a 3.5 μm-thick coating layer.

On the coating layer, the positive active material slurry according to Example 1 was coated and then, dried and compressed to form a 60 μm thick positive active material layer and thus manufacture a positive electrode.

The positive electrode was used to manufacture a lithium secondary battery cell according to Example 1.

Comparative Example 4

96 wt % of a mixture of positive active material of LiNi$_{0.6}$Co$_{0.2}$Mn$_{0.2}$O$_2$ and LiNi$_{0.6}$Co$_{0.2}$Al$_{0.2}$O$_2$ (a weight ratio of 80:20) and LiFePO$_4$ having an average particle diameter (D50) of 0.42 μm (a weight ratio of a positive active material:LiFePO$_4$=98:2), 2 wt % of denka black, and 2 wt % of polyvinylidene fluoride were mixed in an N-methyl pyrrolidone solvent to prepare positive active material slurry.

The positive active material slurry was coated on an Al foil current collector and then, coated and dried. Subsequently, the dried product was compressed to form a 60 μm-thick positive active material layer to manufacture a positive electrode.

The positive electrode was used to manufacture a lithium secondary battery cell according to the same method as Example 1.

Evaluation of Charge and Discharge Characteristics

The lithium secondary battery cells according to Example 1 and Comparative Examples 1 and 3 were charged at a constant current and a constant voltage of 0.2 C and 4.3 V under a cut-off condition of 0.1 C, paused for 10 minutes, discharged at a constant current of 0.2 C under a cut-off condition of 3.0 V, and paused for 10 minutes, which was regarded as one charge and discharge cycle.

Figure 4:
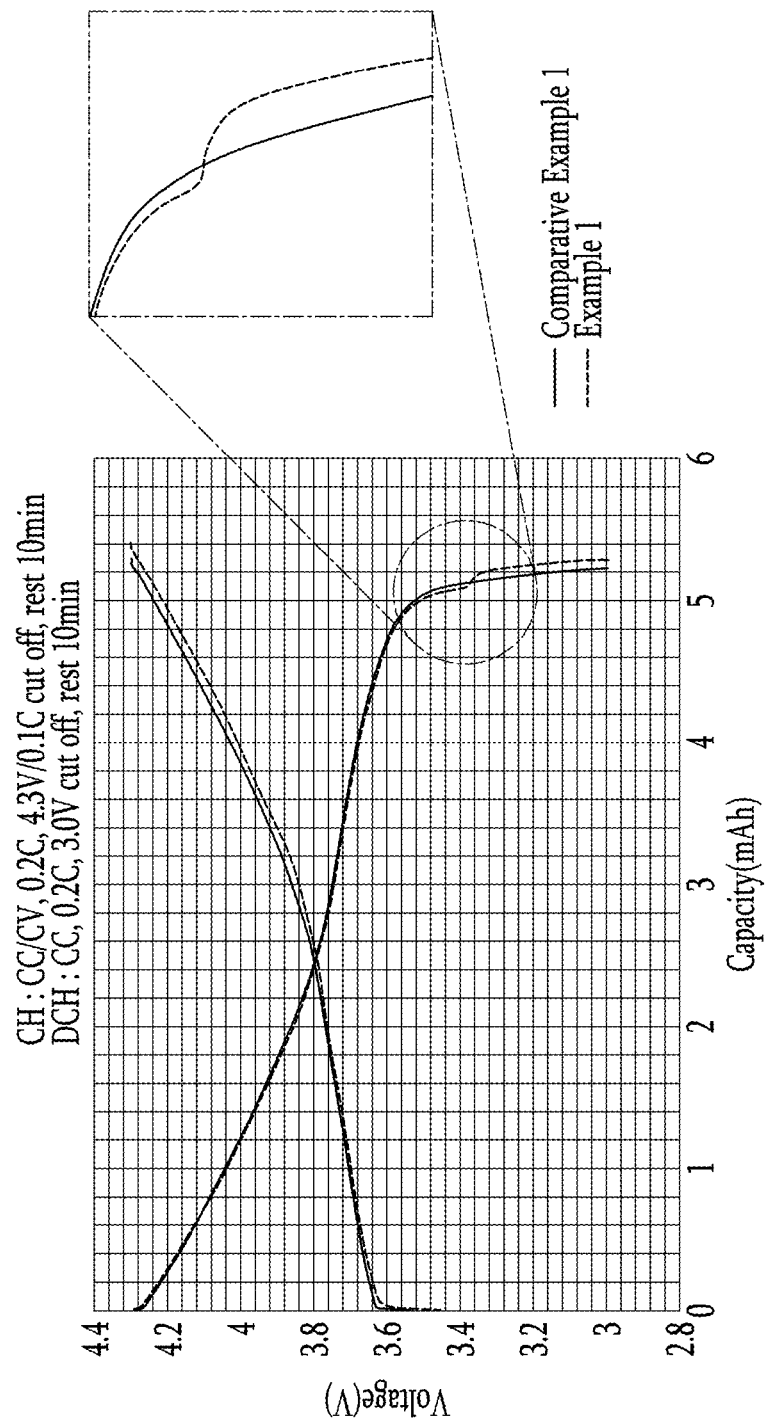
FIG. 4 is a graph showing charge and discharge characteristics of the half-cells including the positive electrodes manufactured according to Example 1 and Comparative Example 1.
Figure 5:
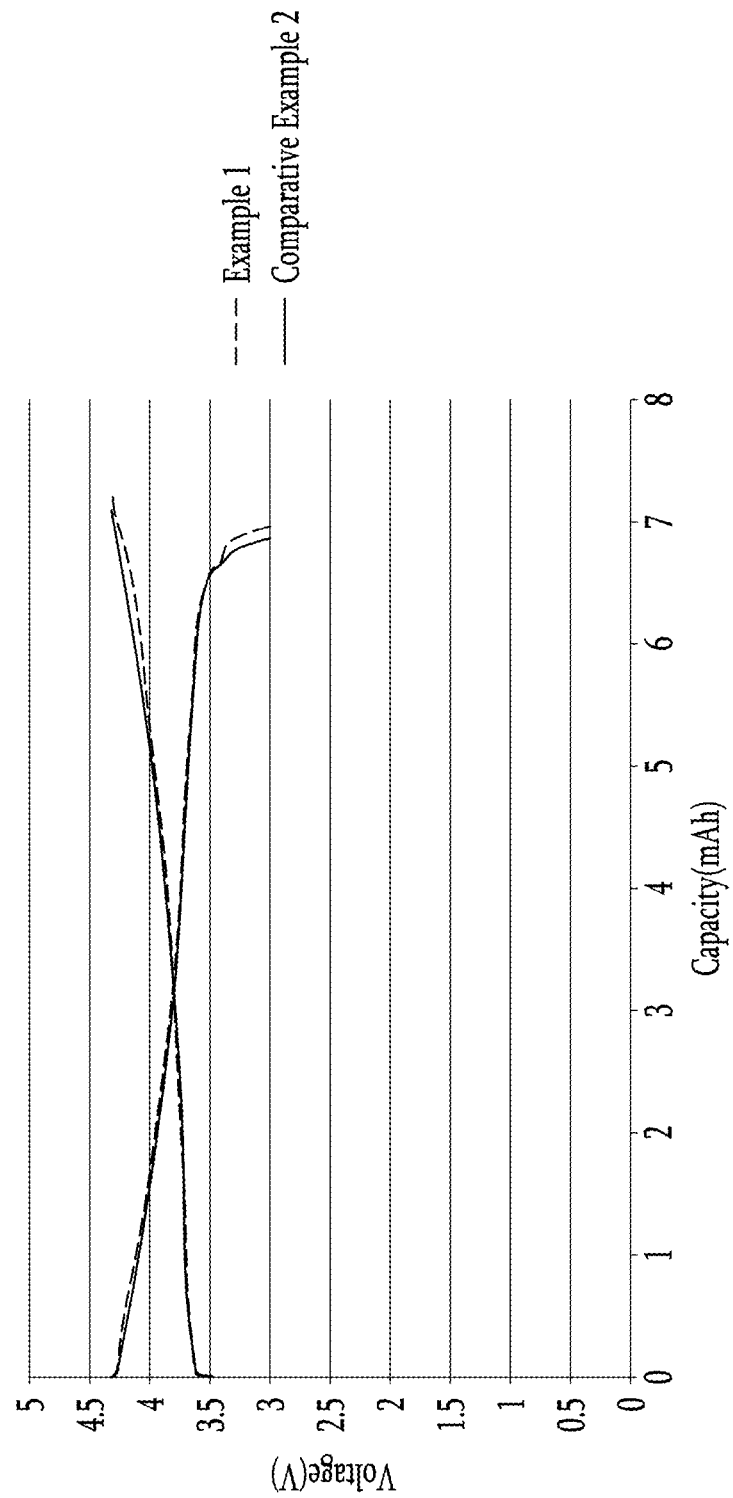
FIG. 5 is a graph showing charge and discharge characteristics of the half-cells including the positive electrodes manufactured according to Example 1 and Comparative Example 2.

Charge and discharge characteristics of Example 1 and Comparative Example 1 depending on the charge and discharge are shown in FIG. 4, and charge and discharge characteristics of Example 1 and Comparative Example 2 on the charge and discharge are shown in FIG. 5. As shown in FIG. 4, the lithium secondary battery cell further having a coating layer according to Example 1 showed a capacity increase compared with the lithium secondary battery cell having no coating layer according to Comparative Example 1. In addition, as shown in FIG. 5, the lithium secondary battery cell having a coating layer using LiFePO$_4$ having an average particle diameter (D50) of 0.42 μm according to Example 1 showed a capacity increase compared with the lithium secondary battery cell having a coating layer using LiFePO$_4$ having an average particle diameter (D50) of 3.2 μm according to Comparative Example 2, and this result shows that when an average particle diameter (D50) was more than 2 μm, an utilization rate of LiFePO$_4$ was sharply decreased.

Penetration Experiment Evaluation

Figure 6:
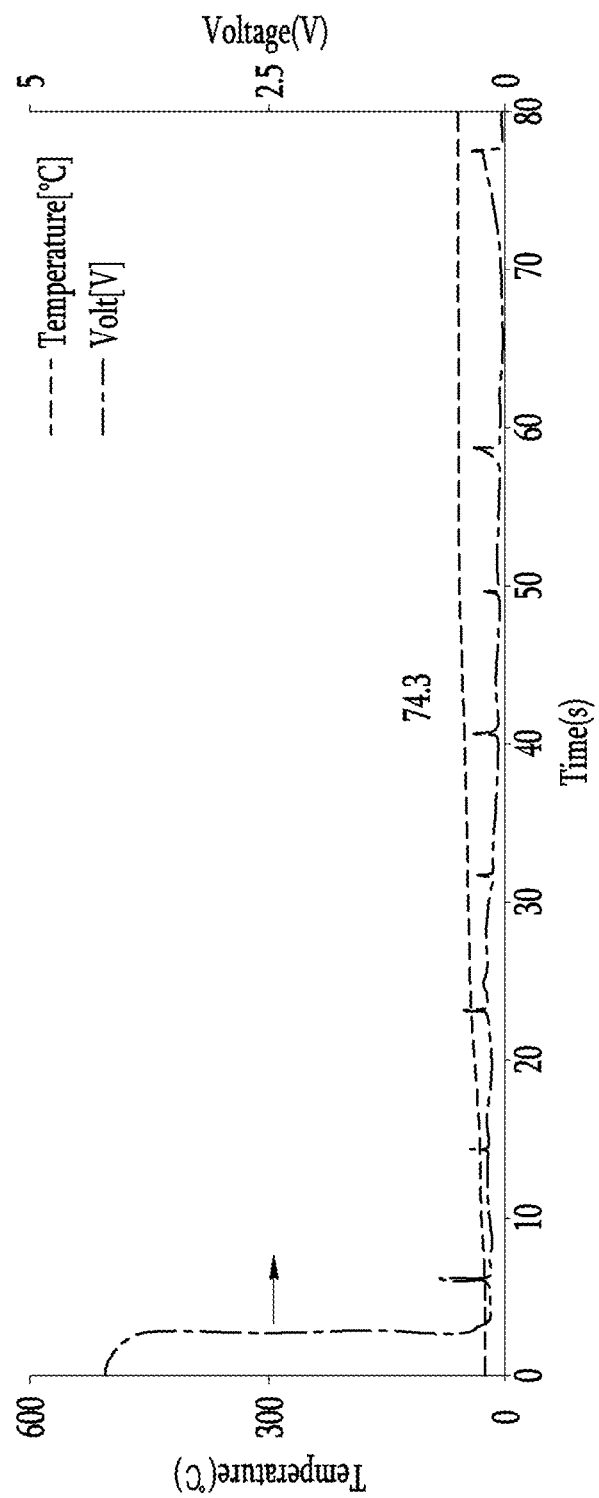
FIG. 6 is a graph showing changes in temperatures and voltages according to a penetration test of the half-cell including the positive electrode manufactured according to Example 1.
Figure 7:
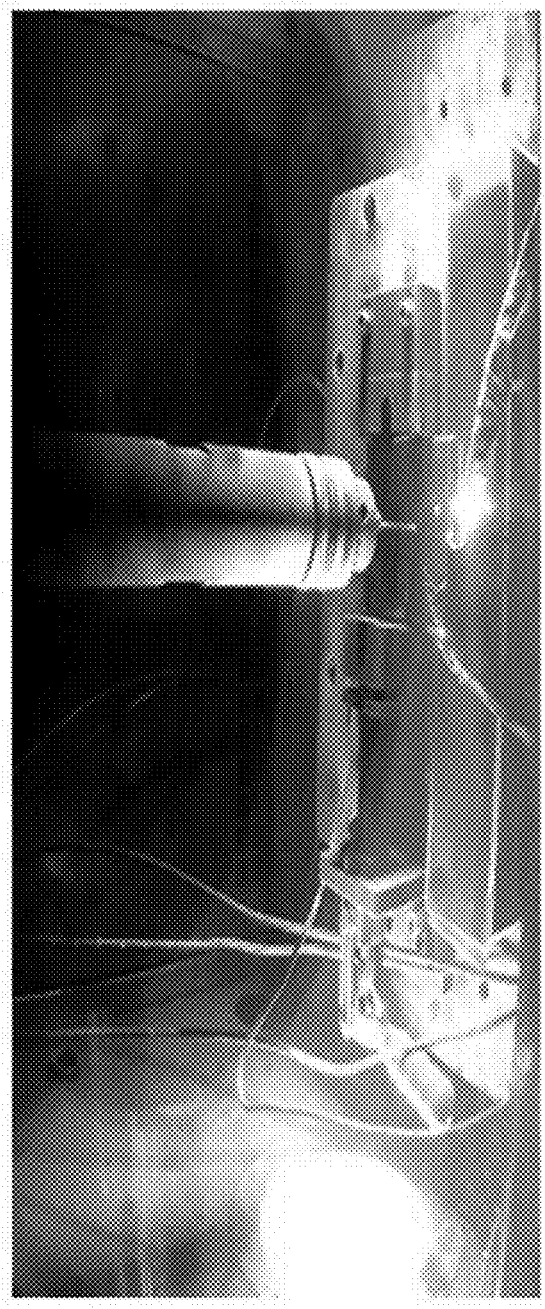
FIG. 7 is a photograph of the penetration test shown in FIG. 5.
Figure 8:
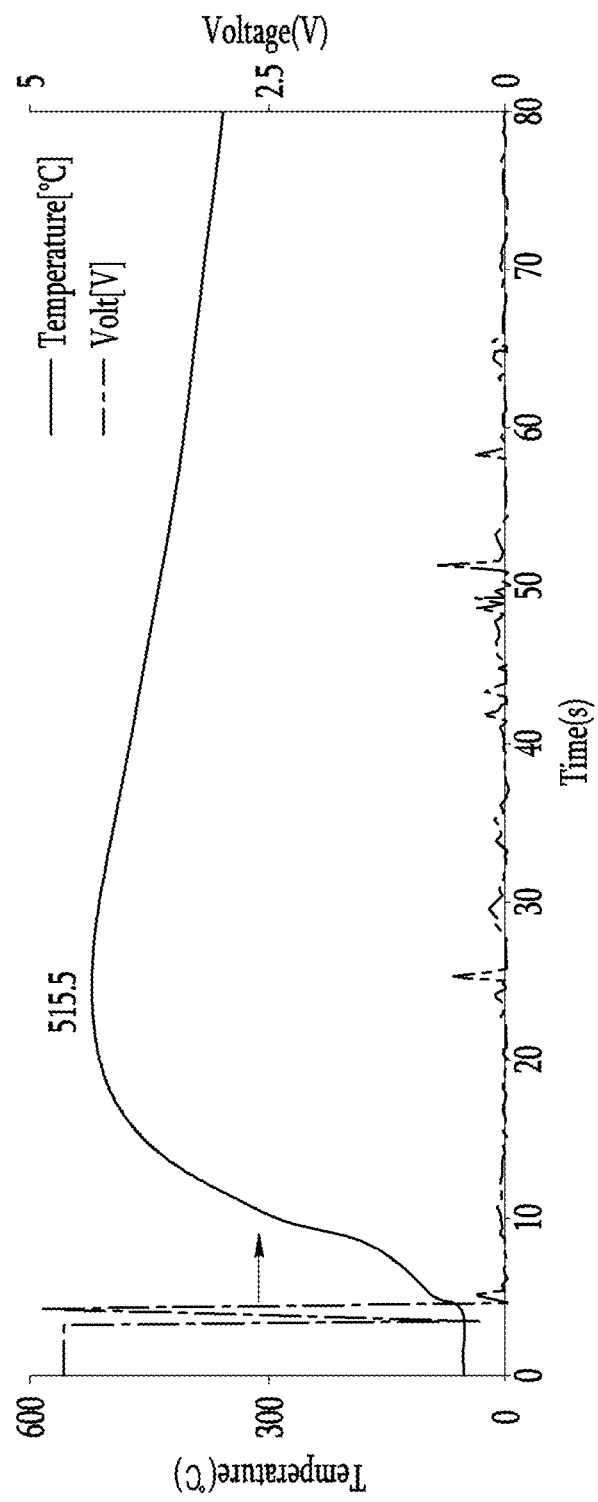
FIG. 8 is a graph showing changes in temperatures and voltages according to a penetration test of the half-cell including the positive electrode manufactured according to Comparative Example 1.
Figure 9:
FIG. 9 is a photograph of the penetration test shown in FIG. 8.

A temperature and a battery voltage were measured by performing a penetration experiment regarding the lithium secondary battery cells according to Example 1 and Comparative Example 1, and then, the results of Example 1 are shown in FIGS. 6 and 7, and the results of Comparative Example 1 are shown in FIGS. 8 and 9.

The penetration experiment was performed by charging the lithium secondary battery cells at 0.5 C up to 4.25 V for 3 hours and pausing the charge for about 10 minutes (possible up to 72 hours) and then, completely penetrating a center of the cells with a pin having a diameter of 5 mm at 60 Mm/sec.

As shown in FIG. 6, the lithium secondary battery cell of Example 1 showed the highest exothermic temperature of 74.3° C., but as shown in FIG. 8, a lithium secondary battery cell of Comparative Example 1 showed the highest exothermic temperature of 515.5° C., and accordingly, the lithium secondary battery cell of Example 1 showed a lower penetration exothermic temperature and thus more excellent stability than the lithium secondary battery cell of Comparative Example 1.

As shown in FIG. 7, the lithium secondary battery cell of Example 1 was not ignited in the penetration experiment, but as shown in FIG. 9, the lithium secondary battery cell of Comparative Example 1 was ignited.

This result shows that the lithium secondary battery cell of Example 1 showed very excellent safety compared with the lithium secondary battery cell of Comparative Example 1.

Thermal Stability Evaluation

Thermal stability of the lithium secondary battery cells according to Examples 1 to 2 and Comparative Examples 1 to 2 was evaluated as follows. In addition, each two battery cells of Example 2 and Comparative Example 2 was respectively manufactured, and thermal stability thereof was evaluated. In other words, this experiment was performed regarding one battery cell of Example 1, two battery cells of Example 2, one battery cell of Comparative Example 1, and two battery cells of Comparative Example 2.

The lithium secondary battery cells were twice charged and discharged at 0.2 C and a cut-off voltage of 3.0 V to 4.3 V (a formation process) and once charged at 0.2 C and a cut-off voltage of 4.3 V. A positive electrode was taken out from the charged battery under an argon atmosphere, 5 mg of a positive active material was taken from the positive electrode, and an exothermic, i.e., heat flow change thereof was measured by using differential scanning calolimetry (DSC). The differential scanning calolimetry was used to measure the exothermic, i.e., heat flow change by increasing a temperature from 40° C. up to 400° C. at 10° C./min.

The calculated exothermic heat, i.e., heat flow (an integral value of an exothermic value curve of DSC by a temperature) was shown in Table 1, and a crystallization-starting temperature (onset 1, onset 2) and a maximum peak temperature are shown in Table 1. In addition, the results of Example 1 and Comparative Example 1 among the DSC measurement results are shown in FIG. 9. In FIG. 9, an Y-axis indicates an exothermic value (a heat flow, W/g).

TABLE 1

|  | Crystallization on-set temperature (Onset1, ° C.) | Crystallization on-set temperature (Onset2, ° C.) | Maximum peak temperature (° C.) | Exothermic heat (J/g) |
| --- | --- | --- | --- | --- |
| Comparative Example 1 | 219 | 256 | 260 | 850 |
| Example 1 | 224 | 254 | 261 | 679 |

Figure 10:
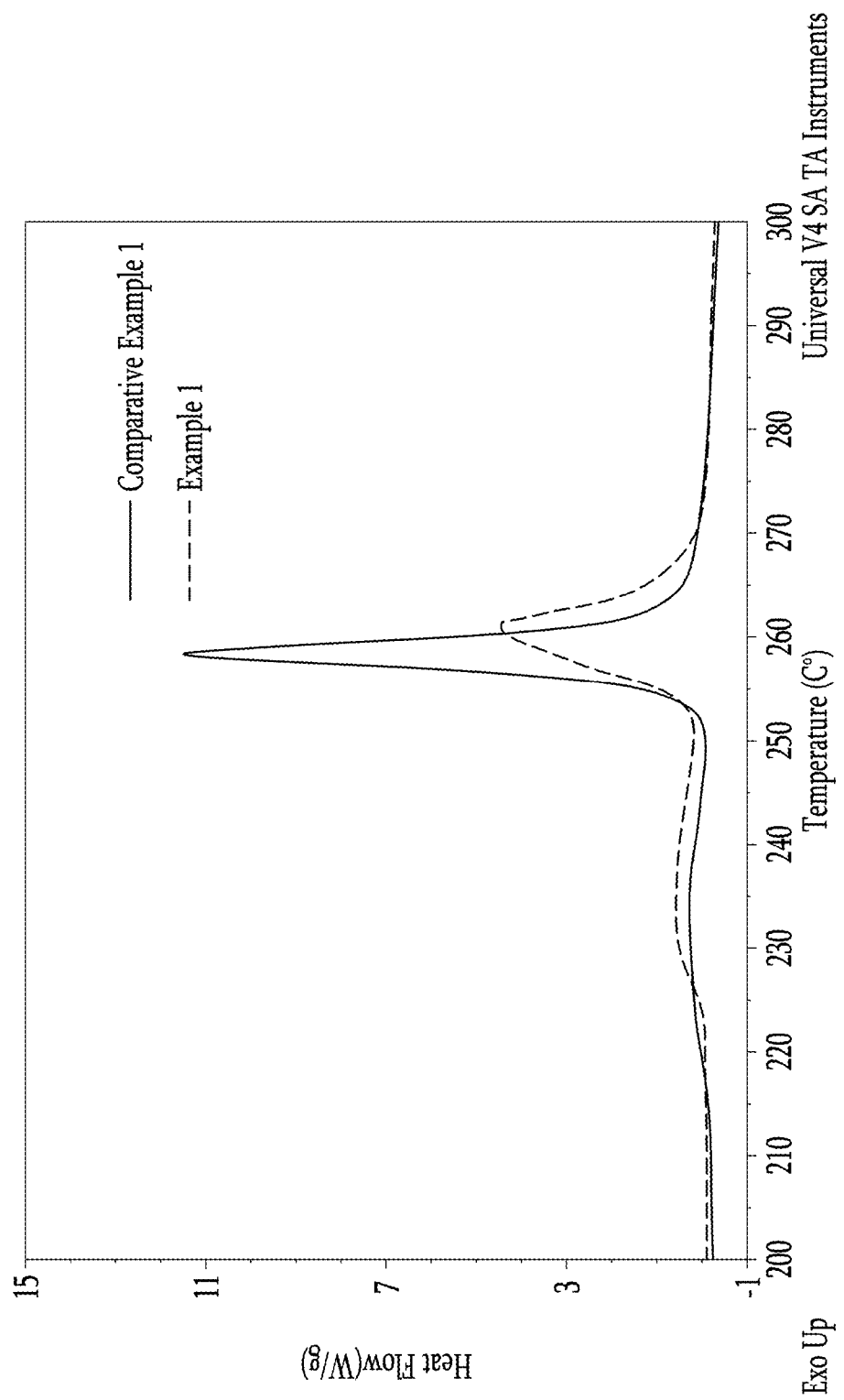
FIG. 10 is a graph showing results of differential scanning calolimetry (DSC) measurement of the half-cells including the positive electrodes manufactured according to Example 1 and Comparative Example 1.

As shown in Table 1, Example 1 showed remarkably a low exothermic heat compared with that of Comparative Example 1. In addition, as shown in FIG. 10, the lithium secondary battery cell of Example 1 showed a high exothermic temperature where an exothermic peak appeared and in addition, a low exothermic value and a low exothermic heat.

Examples 2 and 3 showed no reaction peak, and the reason is that a decomposition reaction did not occur under a DSC measurement condition, and thus they showed excellent thermal stability.

Evaluation of Spring Back Phenomenon Depending on a Kind of Solvent of Coating Layer A spring back phenomenon depending on a kind of solvent during formation of a coating layer was evaluated by respectively coating a water solvent (Experiment 1) and an N-methyl pyrrolidone solvent (Experiment 2) on the positive active material layer prepared by coating the positive active material slurry of Example 1 on an Al foil current collectorr, and then, measuring a thickness change in each experiment, and the results are shown in Table 2.

TABLE 2

|  | Thickness of current collector and active material layer before solvent coating (μm) | Thickness of current collector and active material layer after solvent coating (μm) |
| --- | --- | --- |
| Test 2 (N-methyl pyrrolidone coating) | 130 | 145 |
| Test 2 (water coating) | 130 | 130.5 |

As shown in Table 2, when N-methyl pyrrolidone, an organic-based solvent, rather than an aqueous solvent, that is, water, in the coating layer was used, the spring back phenomenon severely occurred, and accordingly, thicknesses of a current collector and an active material layer were excessively increased.

Characteristics Evaluation Depending on Coating Layer Position

1) Cycle-life Characteristics Evaluation

Figure 11:
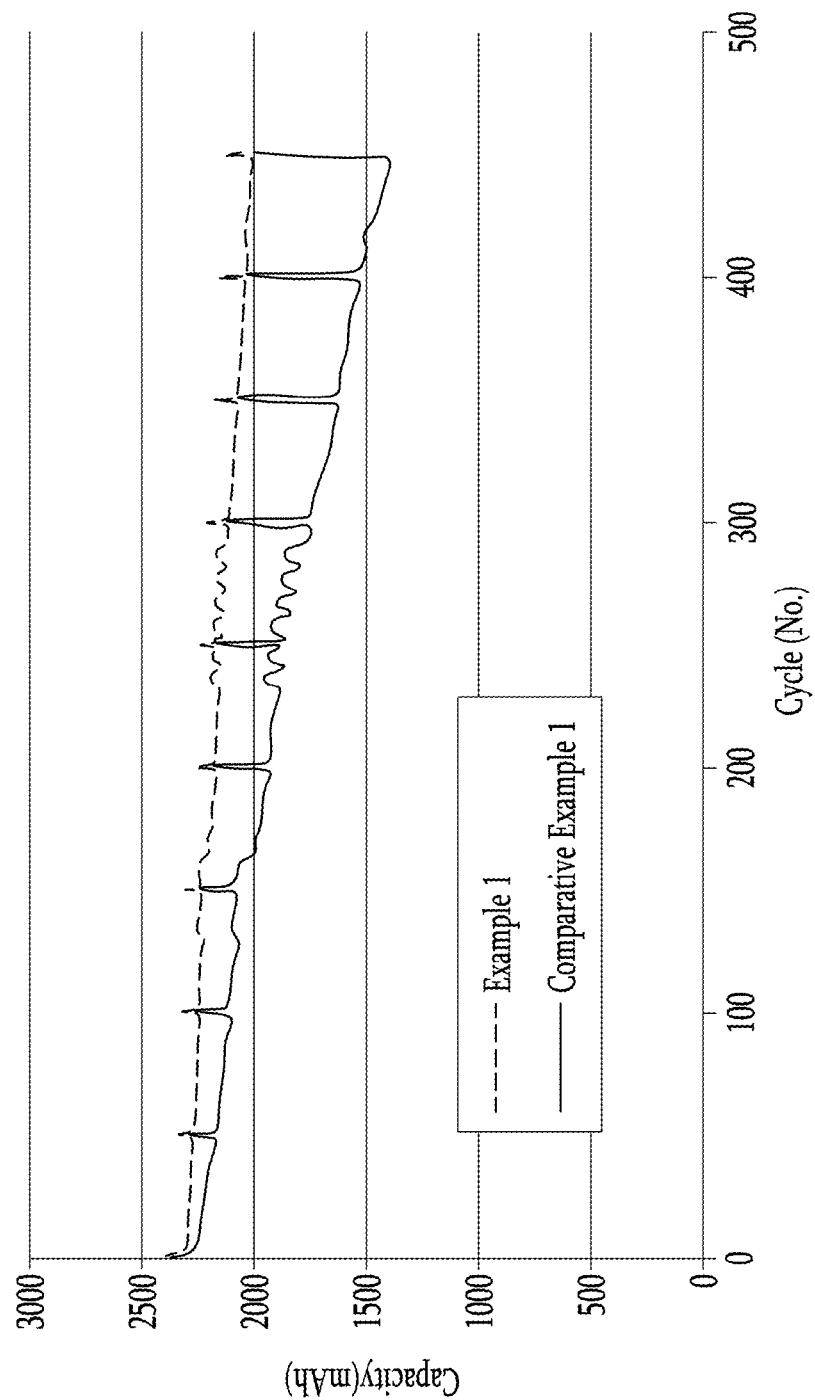
FIG. 11 is a graph showing cycle-life characteristics of the lithium secondary battery cells according to Example 1 and Comparative Example 3.

The lithium secondary battery cells according to Example 1 and Comparative Example 3 were charged at 0.2 C and 4.25 V under a cut-off condition of 0.05 C, paused for 20 minutes, discharged at a constant current of 0.5 C under a cut-off condition of 2.8 V, and paused for 20 minutes at 25° C. which was regarded as one charge and discharge cycle, and this charge and discharge cycle were 500 times repeated to measure discharge capacity of the cells, and the results are shown in FIG. 11. As shown in FIG. 11, the lithium secondary battery cell including a positive electrode having a coating layer including $LiFePO_4$ between a current collector and a positive active material layer according to Comparative Example 3 showed sharply deteriorated cycle-life characteristics compared with the lithium secondary battery cell including a positive electrode having a positive active material layer between a current collector and a coating layer including $LiFePO_4$ according to Example 1.

2) Impedance Measurement

Figure 12:
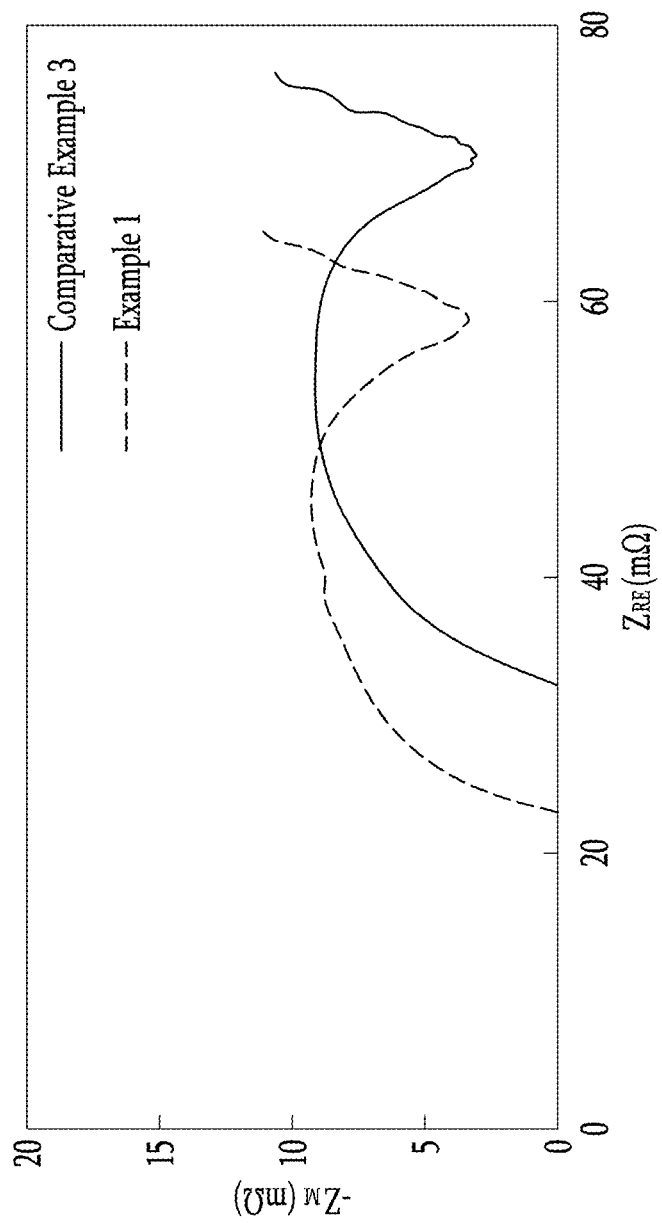
FIG. 12 is a graph showing impedance of the lithium secondary battery cells according to Example 1 and Comparative Example 3.

Impedance of the lithium secondary battery cells according to Example 1 and Comparative Example 3 was measured in an EIS (electrochemical impedance spectroscopy) method, and the results are shown in FIG. 12. As shown in FIG. 12, the lithium secondary battery cell including a positive electrode having a coating layer including $LiFePO_4$ between a current collector and a positive active material layer according to Comparative Example 3 showed a resistance increase compared with the lithium secondary battery cell including a positive electrode having a positive active material layer between a current collector and a coating layer including $LiFePO_4$ according to Example 1.

Referring to FIGS. 11 and 12, when a costing layer including $LiFePO_4$ was formed between a current collector and a positive active material layer, cycle-life characteristics was deteriorated, resistance was increased, and the like.

Characteristics Evaluation Depending on a $LiFePO_4$ Position

The lithium secondary battery cells according to Example 1 and Comparative Example 4 were charged at a constant current and a constant voltage of 0.2 C and 4.25 V under a cut-off condition of 0.05 C, paused for 20 minutes, discharged at a constant current of 0.5 C under a cut-off condition of 2.8 V, and paused for 20 minutes at 25° C., which was regarded as one charge and discharge cycle, and this charge and discharge cycle was 100 times repeated.

Figure 13:
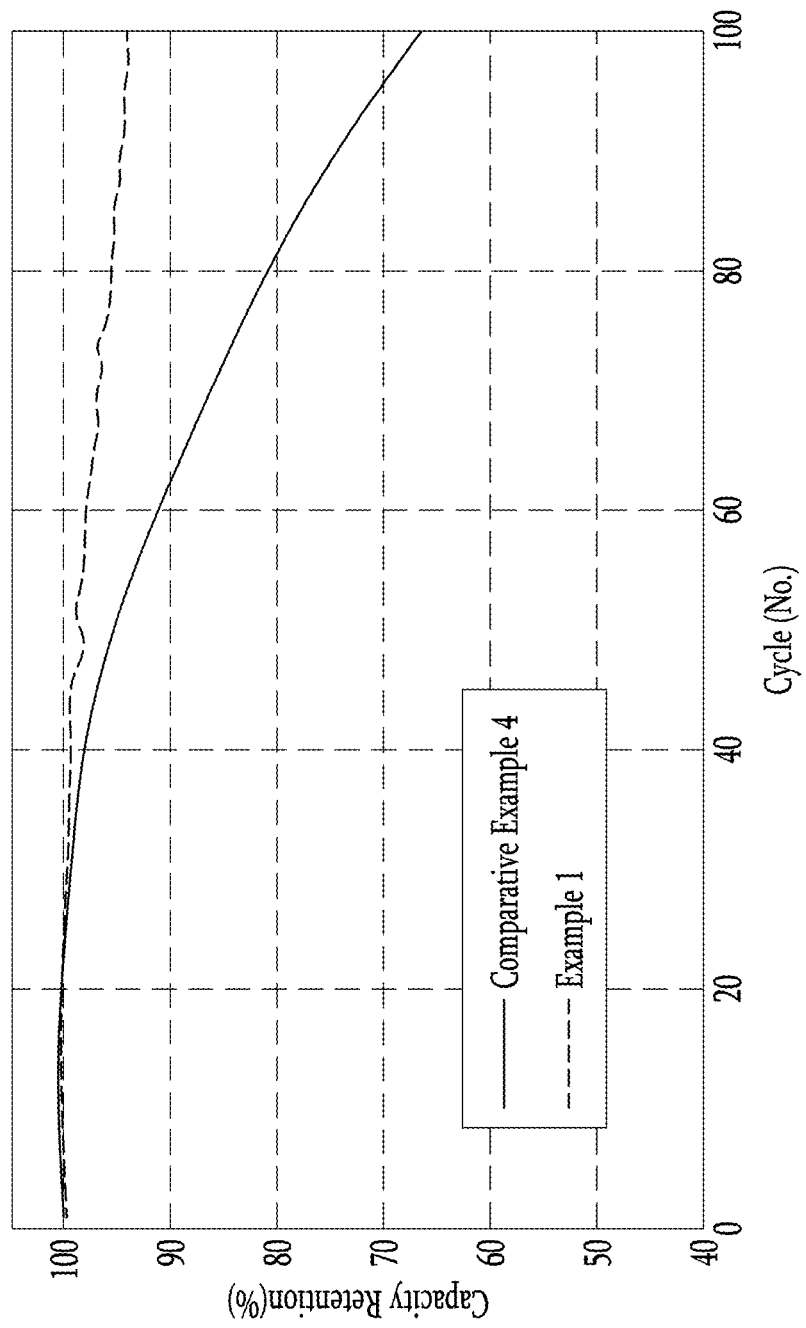
FIG. 13 is a graph showing cycle-life characteristics of the lithium secondary battery cells according to Example 1 and Comparative Example 4.

A discharge capacity retention was obtained at the $100^{th}$ cycles relative to the $1^{st}$ cycle, and the results are shown in FIG. 13. As shown in FIG. 12, Comparative Example 4 not forming a coating layer including $LiFePO_4$ but using it mixed with a positive active material in a positive active material layer showed sharply deteriorated cycle-life characteristics at room temperature compared with Example 1 having a coating layer including $LiFePO_4$.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A positive electrode for a lithium secondary battery, comprising:
   a current collector;
   an active material layer formed on the current collector and comprising a compound capable of intercalating and deintercalating lithium; and a coating layer separately formed on the active material layer and comprising an aqueous binder and a compound of Chemical Formula 1 having an average particle diameter (D50, indicating a diameter of a particle where a cumulative volume is about 50 volume % in a particle distribution) of 0.2 μm to 1 μm;

the aqueous binder comprises a styrene-butadiene rubber, an acrylate-based compound, an imide-based compound, a nitrile-based compound, an acetate-based compound, a cellulose-based compound, or a cyano-based compound:

$Li_aFe_{1-x}M_xPO_4$ [Chemical Formula 1]

wherein, in Chemical Formula 1, $0.90 \leq a \leq 1.8$, $0 \leq x \leq 0.7$, and M is Mg, Co, Ni, or a combination thereof.

2. The positive electrode for a lithium secondary battery of claim 1, wherein a thickness of the coating layer is 1 μm to 13 μm.

3. The positive electrode for a lithium secondary battery of claim 1, wherein the aqueous binder is an aqueous binder having oxidation resistance.

4. The positive electrode for a lithium secondary battery of claim 1, wherein the coating layer further comprises a thickener.

5. The positive electrode for a lithium secondary battery of claim 1, wherein a ratio of the thickness of the active material layer to that of the coating layer is 30:1 to 10:1.

6. The positive electrode for a lithium secondary battery of claim 1, wherein a mixing ratio of the compound of Chemical Formula 1 and the aqueous binder is 24:1 weight ratio to 50:1 weight ratio.

7. A lithium secondary battery, comprising
the positive electrode of claim 1;
a negative electrode comprising a negative active material, and
an electrolyte.

* * * * *